US008141667B2

(12) United States Patent
Shepard, Jr. et al.

(10) Patent No.: US 8,141,667 B2
(45) Date of Patent: Mar. 27, 2012

(54) HYBRID DINGHY PUSHER

(75) Inventors: William Steve Shepard, Jr., Northport, AL (US); William Steve Shepard, Sr., Starkville, MS (US)

(73) Assignee: The Board Of Trustees Of The University Of Alabama For And On Behalf Of Its Component Institution, The University Of Alabama, Tuscaloosa, AL (US)

( * ) Notice: Subject to any disclaimer, the term of this patent is extended or adjusted under 35 U.S.C. 154(b) by 91 days.

(21) Appl. No.: 12/486,405

(22) Filed: Jun. 17, 2009

(65) Prior Publication Data

US 2009/0308670 A1 Dec. 17, 2009

Related U.S. Application Data

(60) Provisional application No. 61/115,340, filed on Nov. 17, 2008, provisional application No. 61/073,225, filed on Jun. 17, 2008.

(51) Int. Cl.
*B62D 59/00* (2006.01)

(52) U.S. Cl. ...................................... 180/14.1; 180/14.6

(58) Field of Classification Search ................. 180/14.1, 180/14.2, 14.6
See application file for complete search history.

(56) References Cited

U.S. PATENT DOCUMENTS

| | | | | |
|---|---|---|---|---|
| 3,874,470 | A * | 4/1975 | Greene | 180/14.3 |
| 4,119,166 | A * | 10/1978 | Ayotte et al. | 180/14.1 |
| 4,405,145 | A * | 9/1983 | Bergman et al. | 280/432 |
| 4,762,191 | A | 8/1988 | Hagin | |
| 4,771,838 | A * | 9/1988 | Ketcham | 180/6.62 |
| 6,390,215 | B1 * | 5/2002 | Kodama et al. | 180/65.22 |
| 6,419,037 | B1 * | 7/2002 | Kramer et al. | 180/14.2 |
| 7,338,335 | B1 * | 3/2008 | Messano | 180/65.22 |
| 7,743,859 | B2 * | 6/2010 | Forsyth | 180/65.1 |
| 7,798,263 | B2 * | 9/2010 | Tandy et al. | 180/14.6 |
| 2007/0194557 | A1 * | 8/2007 | Caporali et al. | 280/493 |
| 2009/0127008 | A1 * | 5/2009 | Batdorf | 180/11 |
| 2009/0315338 | A1 * | 12/2009 | Ylvisaker | 290/1 R |
| 2010/0065344 | A1 * | 3/2010 | Collings, III | 180/2.1 |
| 2010/0065348 | A1 * | 3/2010 | Arad | 180/11 |
| 2010/0141201 | A1 * | 6/2010 | Littrell et al. | 320/101 |

* cited by examiner

*Primary Examiner* — Kevin Hurley
(74) *Attorney, Agent, or Firm* — Ballard Spahr LLP

(57) ABSTRACT

A hybrid dinghy pusher for pushing motorhomes is provided. A hybrid vehicle can be connected to a motorhome by a tow bar for towing the hybrid vehicle. When being towed behind a motorhome, the hybrid vehicle can be switched into hybrid dinghy pusher mode. In this mode, during acceleration of the motorhome, the electrical batteries and motors of the hybrid vehicle can provide a propulsive force through the tow bar to the motorhome, which assists the motorhome in accelerating and improves fuel efficiency. Additionally, the dinghy motors can act as generators when appropriate, creating energy which can be stored in batteries for later use during acceleration. The resistance created by the hybrid vehicle can also provide an additional braking force to the motorhome via the tow bar.

21 Claims, 2 Drawing Sheets

40
10
12
22
16 20 44
42

HYBRID DINGHY PUSHER

This application claims priority to and the benefit of U.S. Provisional Application No. 61/115,340, filed on Nov. 17, 2008, and U.S. Provisional Application No. 61/073,225, filed on Jun. 17, 2008, which applications are both incorporated in their entirety in this document by reference.

FIELD OF THE INVENTION

The field of this invention relates generally to hybrid motor vehicles and more particularly to a hybrid motor vehicle as a hybrid dinghy pusher for motorhomes.

BACKGROUND OF THE INVENTION

While traveling, many motorhome owners tow a separate passenger vehicle, often referred to as a dinghy. When the motorhome is parked, the dinghy can be easily used for convenient, localized travel. When being towed behind the motorhome, however, the presence of the dinghy adds mass and resistance that the motorhome must pull, thereby decreasing motorhome fuel efficiency. Additionally, the additional mass and resistance created by a dinghy-in-tow can decrease motorhome driving performance, especially the acceleration rate.

In view of the preceding, there is a need for a dinghy that can increase motorhome driving performance and/or motorhome fuel economy.

SUMMARY

The invention relates to the use of a hybrid vehicle as a Hybrid Dinghy Pusher for motorhomes. In one aspect, the hybrid vehicle can be connected to a motorhome by a tow bar. In another aspect, the hybrid vehicle can be unconnected from the motorhome and driven alone.

When unconnected from the motorhome and driven alone, the hybrid vehicle can operate as a fully functional hybrid vehicle, using its on-board internal combustion engine, if so equipped, when necessary. When being towed behind a motorhome, the hybrid vehicle can switch or can be switched into hybrid-dinghy pusher ("HDP") mode. In HDP mode, only the electrical portion of the hybrid vehicle is used. During acceleration of the motorhome, the dinghy's electrical batteries and motors can provide a propulsive force either reducing the load on the tow bar or providing a force through the tow bar to the motorhome, assisting the motorhome in accelerating. When the motorhome decelerates (e.g., when the brakes of the motorhome are activated), the dinghy can switch its motors to act as generators. This resistance can provide an additional braking force to the motorhome via the tow bar. The energy generated by the motors can be stored in the battery bank of the hybrid vehicle and/or a battery bank of the motorhome for later use during acceleration. An HDP control system can control when the hybrid vehicle provides acceleration assistance, braking assistance, and/or other assistance to the motorhome and dinghy system.

DETAILED DESCRIPTION OF THE FIGURES

These and other features of the preferred embodiments of the invention will become more apparent in the detailed description in which reference is made to the appended drawings wherein.

DETAILED DESCRIPTION OF THE INVENTION

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a car" can include two or more such cars unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, the terms "hybrid" and "hybrid vehicle", can refer to a hybrid-electric vehicle, to an electric vehicle, or to any other vehicle capable of capturing and/or storing energy.

Figure 1:
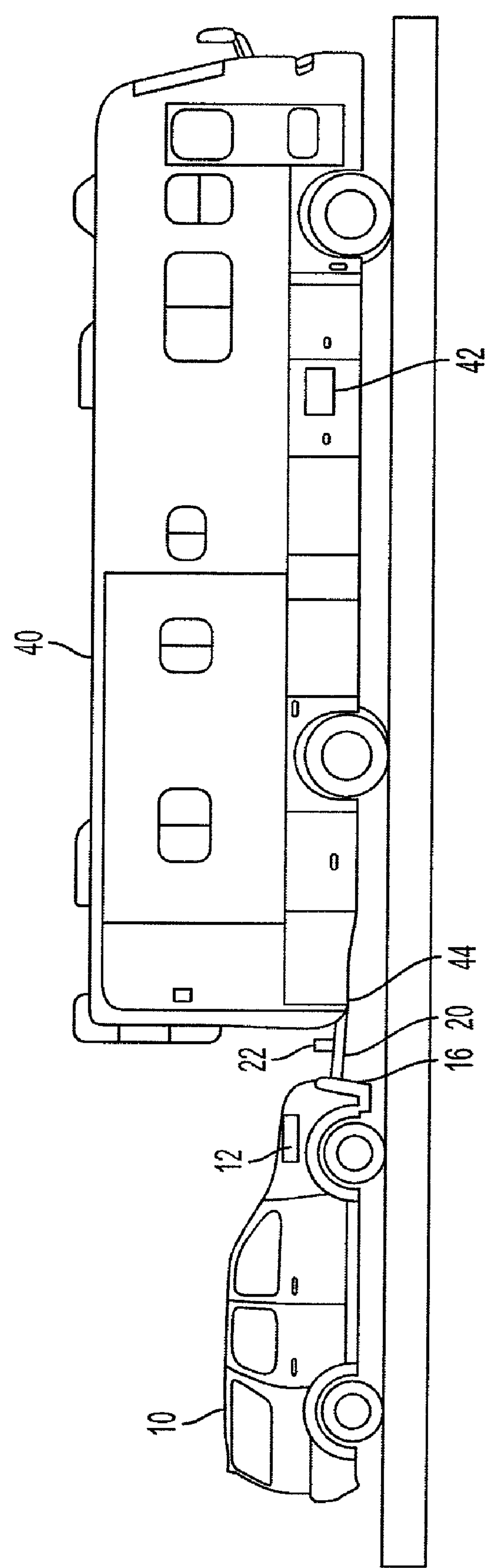
FIG. 1 is side view of a hybrid dinghy pusher attached to a motorhome, according to one aspect, showing a hybrid vehicle and a tow bar.

A hybrid dinghy pusher for motorhomes is provided, according to various aspects. In one aspect, as illustrated in FIG. 1, the hybrid dinghy pusher can comprise a hybrid vehicle 10, a tow bar 20, and a control system, not shown. Although reference will be made herein to a motorhome, defined as a vehicle with a room-like area outfitted as living quarters, it is contemplated that the hybrid dinghy pusher can be used with any vehicle capable of towing a hybrid vehicle.

The hybrid vehicle 10, according to one aspect, can be any standard commercially available hybrid-electric or electric vehicle. Hybrid-electric vehicles incorporate electrically operated motors used in conjunction with batteries and an internal combustion engine. Electric vehicles incorporate electrically operated motors in conjunction with batteries without an on-board internal combustion engine.

The electric motors of the hybrid vehicle 10 can provide electric-only starts. In one aspect, when equipped with an on-board internal combustion engine, the hybrid vehicle can use power provided by the on-board internal combustion engine when desired. While braking, the electric motors of the hybrid vehicle can act as generators. In another aspect, the hybrid vehicle can be a hybrid sport utility vehicle ("SUV") having larger electrical components (i.e. batteries and motors) than a non-SUV hybrid vehicle. For example, the hybrid Yukon model SUV from the General Motors Corporation uses two 60 kilowatt electric motors and a 300V battery pack along with an internal combustion engine.

Figure 2:
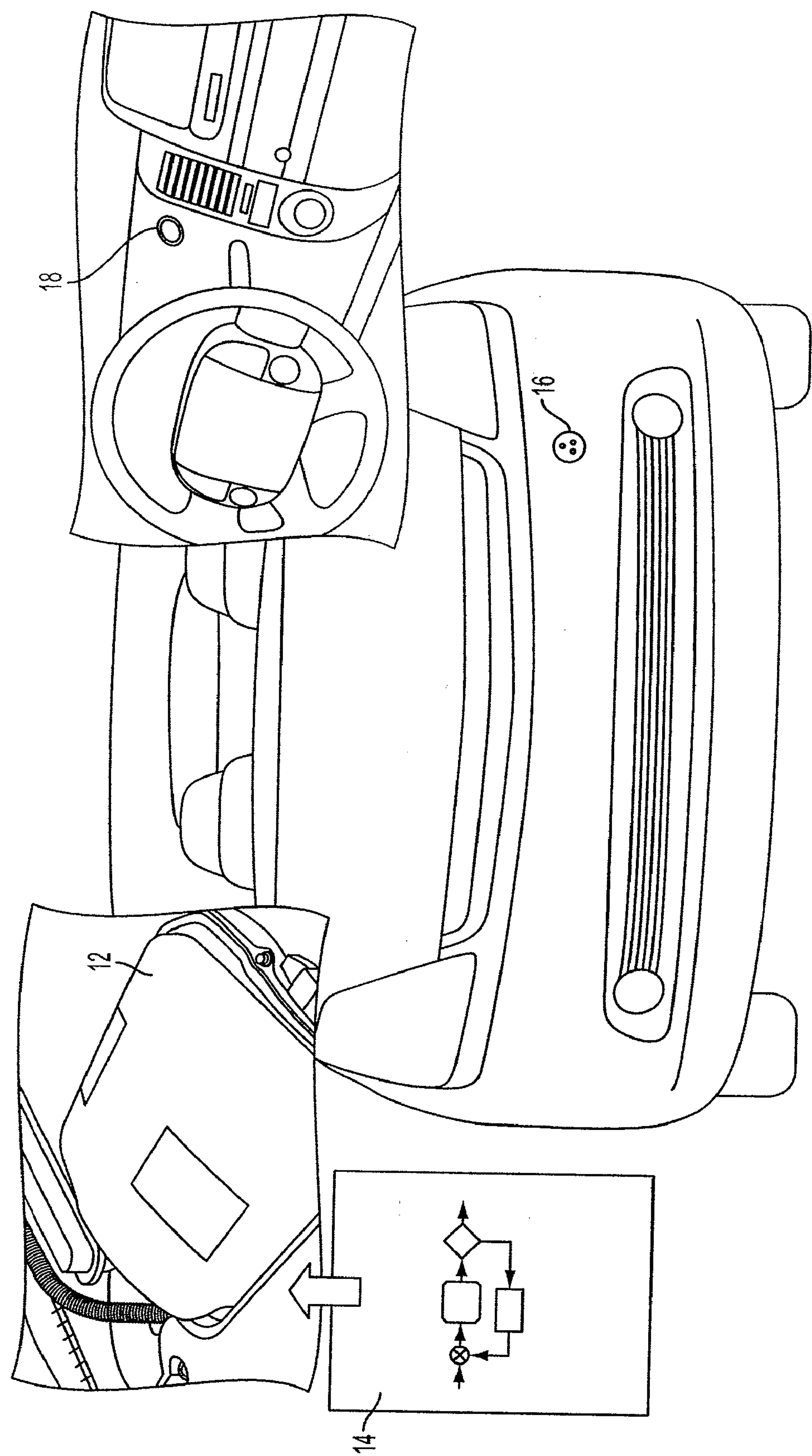
FIG. 2 is front view of the hybrid vehicle of FIG. 1.

In one aspect, when being towed behind a motorhome 40 and when coupled to the motorhome, as will be described more fully below, the hybrid vehicle 10 can switch into hybrid dinghy pusher ("HDP") mode. Alternatively, the hybrid vehicle can be manually switched into HDP mode by activating a switch 18 in or on the hybrid vehicle, as illustrated in FIG. 2. In another aspect, while in HDP mode, only the electrical portion of the hybrid vehicle is used. Additionally, while in HDP mode, the hybrid vehicle can appropriately respond to operational information transmitted to it by, for example and without limitation, providing an additional propulsive force to the dinghy and/or to the motorhome, switching its motors to act as generators, activating its hydraulic brakes, or by doing nothing so that the hybrid vehicle 10 is towed as a standard dinghy would be.

In one aspect, the tow bar 20 can be a conventional tow bar configured for pulling a dinghy from a motorhome 40, as is commonly know in the art. The tow bar can be integral with the motorhome, or the tow bar can be separate from the motor home and installed thereto. In another aspect, the tow bar can be configured to accommodate additional pulling and pushing loads created by the hybrid vehicle 10. In yet another aspect, the tow bar can be configured to prevent the hybrid vehicle from pushing up on the back of the motorhome (i.e., keeping the front wheels of the hybrid vehicle from leaving the ground). In still another aspect, the tow bar 20 can be configured for securing control cables that can be configured for coupling a motorhome controller 42, a hybrid vehicle controller 12, and/or at least one sensor, as will all be described more fully below. In a further aspect, the tow bar 20 can further comprise power cables that can be configured for electrically coupling batteries on-board the motorhome to the hybrid vehicle, as will also be described more fully below. In another aspect, the tow bar can further comprise at least one tow bar sensor 22, mounted at any location on the tow bar including, for example and without limitation, at the connection between the motorhome 40 and the tow bar 20. In one aspect, the at least one tow bar sensor can determine, for example and without limitation, when the motorhome and hybrid vehicle 10 are not aligned, such as would occur during a turn.

The control system can control the push-pull operation of the hybrid vehicle 10. In one aspect, the control system can comprise a motorhome controller 42 and a hybrid vehicle controller 12. In another aspect, the control system of the hybrid vehicle can be coupled to the conventional vehicle controller of the motorhome and/or the hybrid vehicle. In yet another aspect, the control system can comprise at least one controller that can be a motorhome controller and/or a hybrid vehicle controller. In another aspect, the control system can further comprise at least one sensor that can be located on the hybrid vehicle and/or on the motorhome for sensing operating conditions, such as speed, acceleration, angle of incline, tangential forces created, for example, during turns, and the like. As previously described, the at least one tow bar sensor 22 can also be configured for sensing this information and supplying it to the control system. The motorhome controller 42 and/or the hybrid vehicle controller 12 can be configured for receiving operating conditions from the at least one sensor and/or the at least one tow bar sensor and calculating what assistance, if any, the hybrid vehicle is to provide to the motorhome. In yet another aspect, the control system can further comprise a feedback loop 14, as commonly known in the art. The feedback loop can be located in the motorhome controller and/or in the hybrid vehicle controller and can be configured to control the motorhome 40 and/or the hybrid vehicle 10.

The control system can further comprise a means for coupling the motorhome controller 42 and the hybrid vehicle controller 12. As understood by one of skill in the art, this coupling can occur through wires, such as control cables, or wirelessly. In one aspect, the motorhome can comprise a motorhome connector 44 located on or near the exterior of the motorhome configured for selective, releasable attachment of wires or control cables in order to couple the motorhome controller and the hybrid vehicle controller. In another aspect, the hybrid vehicle 10 can further comprise a hybrid vehicle connector 16 located on or near the exterior of the hybrid vehicle configured for selective, releasable attachment of wires or control cables in order to couple the motorhome controller 42 and the hybrid vehicle controller 12.

In another aspect, the control system can be configured to process the information supplied to it by the conventional vehicle controller of the motorhome and/or the hybrid vehicle and/or the various sensors as described above. The processing of this information can be performed by the motorhome controller 42 and/or the hybrid vehicle controller 12. In one aspect, the hybrid vehicle controller can output signals to the motorhome controller, and the motorhome controller can output signals to the hybrid vehicle controller. In another aspect, the control system can translate these signals and other operational information supplied to it to determine what operational assistance, if any, is to be provided by the hybrid vehicle to the motorhome.

In another aspect, the control system can actuate the hybrid vehicle in response to the determination of operation assistance. For example, in one aspect, the control system can actuate the hydraulic brake systems within the hybrid vehicle, as is commonly known in the art. In another aspect, the control system can control when the hybrid vehicle 10 provides propulsion to the motorhome, when the hybrid vehicle provides braking resistance, and when the hybrid vehicle does nothing. For example and not meant to be limiting, a sensor can signal that the motorhome 40 and the hybrid vehicle are out of alignment, such as might occur during a turn. In this example, the hybrid vehicle 10 most likely would not provide propulsion during acceleration, which could potentially cause the motorhome rear to slide sideways. In still another aspect, the hybrid vehicle can provide propulsion that may not be sufficient to propel the hybrid vehicle and the motorhome, however, as can be appreciated, any propulsion supplied by the hybrid vehicle can reduce the towing load imposed by the hybrid vehicle on the motorhome and thereby improve the fuel economy of the motorhome.

The control system can further comprise safety mechanisms in the event that proper information is not received by the control system or some other fault occurs. In one aspect, the safety mechanism can cause the hybrid vehicle 10 to resort to an inactive mode in which the hybrid vehicle acts as a conventional dinghy.

With reference to FIG. 1, a hybrid dinghy pusher can be assembled to comprise any or all of the components as described above. In one embodiment, the tow bar 20 can be fixably attached to the hybrid vehicle 10, as is commonly know in the art. The tow bar can also be fixedly attached to the rear of the motorhome, as is also commonly known in the art. If both a motorhome controller 42 and a hybrid vehicle controller 12 are to be used, they can be coupled together, either wirelessly or by making the appropriate control cable connections.

With the hybrid dinghy pusher fully assembled, the hybrid vehicle 10 can switch or be switched into HDP mode. In one aspect, in HDP mode, only the electrical portion of the hybrid vehicle is used. Operational information from the motorhome 40, such as, for example and not meant to be limiting, speed, acceleration, and braking can be transmitted to the motorhome controller 42 and/or the hybrid vehicle controller 12. Additionally, at least one sensor, which can be located on the motorhome, the tow bar 20, and/or the hybrid vehicle 10, can transmit signals representing operating conditions to the motorhome controller and/or to the hybrid vehicle controller. The motorhome controller can relay signals to the hybrid vehicle controller as necessary.

In one example, during acceleration of the motorhome 40, a signal representing the acceleration rate can be transmitted to the motorhome controller and/or the hybrid vehicle controller 12. The motorhome and/or hybrid vehicle controller can determine if, when, and how much of an additional propulsive force from the hybrid vehicle 10 is needed. The electrical batteries and motor of the hybrid vehicle can then be activated at the appropriate time to provide the appropriate additional propulsive force to the hybrid vehicle and/or to the motorhome by pushing the motorhome 40. This additional propulsive force can improve motorhome acceleration and/or increase motorhome fuel efficiency.

In another example, when brakes on the motorhome are activated, the motorhome and/or hybrid vehicle controller can be signaled so that the motors of the hybrid vehicle 10 can be switched to act as generators. This creates resistance that can provide an additional braking force to the motorhome 40 via the tow bar 20, thereby reducing wear on the braking system of the motorhome. The energy generated by the motors is stored in the battery bank of the hybrid vehicle 10 for later use during acceleration.

In yet another example, when accelerating through a turn, the acceleration rate and the turning radius can be transmitted to the motorhome and/or the hybrid vehicle controller 12. The motorhome and/or the hybrid vehicle controller can determine whether the hybrid vehicle can safely push the motorhome 40 or whether no additional propulsion is necessary in order to safely operate the motorhome.

In another example, if the motorhome is operating under cruise control, wherein the speed of the motorhome 40 is maintained by a system on the motorhome without requiring the driver of the motorhome to depress a gas and/or brake pedal, and the motorhome 40 needs to be slowed, the cruise control system of the motorhome can send a signal to the motorhome and/or the hybrid vehicle controller. The motorhome and/or the hybrid vehicle controller can determine if, when, and how much of a resistive force from the hybrid vehicle 10 is needed. Thus, in this example, the motors and generators of the hybrid vehicle can provide a resistive force to the motorhome 40, thereby slowing the motorhome, without the brakes of the motorhome being applied.

In one aspect, energy created by the motors of the hybrid vehicle can be stored in batteries located on the hybrid vehicle 10. In another aspect, energy created by the motors of the hybrid vehicle can be transmitted through wires to batteries located on the motorhome 40. Similarly, energy used by the electric motors of the hybrid vehicle can be supplied by batteries located on the hybrid vehicle and/or through wires from batteries located on the motorhome.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A hybrid dinghy pusher for a motorhome comprising:

a hybrid vehicle comprising an internal combustion engine, an electrical motor and at least one battery, wherein the internal combustion engine selectively propels the hybrid vehicle, wherein the electric motor selectively propels the hybrid vehicle and selectively generates electricity for storage in the at least one battery;

a tow bar configured for coupling the hybrid vehicle to the motorhome; and a means for controlling activation of the hybrid vehicle to selectively provide operational assistance from the electric motor to the motorhome.

2. The hybrid dinghy pusher of claim 1, wherein the means for controlling activation of the hybrid vehicle comprises:

at least one sensor, each sensor configured for sensing at least one operating condition of the motorhome; and at least one controller configured to perform the steps of:

processing sensed data from the at least one sensor;

determining what operational assistance is to be provided by the hybrid vehicle to the motorhome; and actuating the hybrid vehicle in response to the determination of operation assistance.

3. The hybrid dinghy pusher of claim 2, wherein the step of actuating the hybrid vehicle comprises at least one of:

actuating the electrical motor of the hybrid vehicle to selectively propel the hybrid vehicle;

actuating the electrical motor to provide selective braking resistance to the hybrid vehicle and the motorhome; and actuating a braking system of the hybrid vehicle to provide selective braking resistance to the hybrid vehicle and the motorhome.

4. The hybrid dinghy pusher of claim 3, wherein actuating the electrical motor of the hybrid vehicle comprises selectively propelling the hybrid vehicle to reduce the towing load on the motorhome.

5. The hybrid dinghy pusher of claim 3, wherein actuating the electrical motor of the hybrid vehicle comprises selectively propelling the hybrid vehicle and the motorhome.

6. The hybrid dinghy pusher of claim 2, wherein the at least one sensor is a sensor selected from the group consisting of:

a speedometer;

an accelerometer;

an angle of incline sensor;

a tangential force sensor; and a sensor for monitoring the alignment of the hybrid vehicle and the motorhome.

7. The hybrid dinghy pusher of claim 2, wherein the at least one sensor comprises a speedometer.

8. The hybrid dinghy pusher of claim 2, wherein the at least one sensor comprises an accelerometer.

9. The hybrid dinghy pusher of claim 2, wherein the at least one sensor comprises an angle of incline sensor.

10. The hybrid dinghy pusher of claim 2, wherein the at least one sensor comprises a tangential force sensor.

11. The hybrid dinghy pusher of claim 2, wherein the at least one sensor comprises a sensor for monitoring the alignment of the hybrid vehicle and the motorhome.

12. The hybrid dinghy pusher of claim 2, wherein the at least one controller comprises a hybrid vehicle controller.

13. The hybrid dinghy pusher of claim 12, wherein the at least one controller further comprises a motorhome controller configured to at least receive operating conditions of the motorhome.

14. The hybrid dinghy pusher of claim 2, wherein the at least one controller comprises a motorhome controller, configured to at least receive operating conditions of the motorhome.

15. The hybrid dinghy pusher of claim 2, wherein the at least one sensor and the at least one controller are electrically coupled.

16. The hybrid dinghy pusher of claim 2, wherein the at least one sensor and the at least one controller are electrically coupled wirelessly.

17. A method of providing operational assistance to a motorhome comprising the steps of:

providing a hybrid vehicle comprising an electrical motor and at least one battery, wherein the electric motor selectively propels the hybrid vehicle and selectively generates electricity for storage in the at least one battery;

providing a tow bar configured for coupling the hybrid vehicle to the motorhome;

providing a motorhome controller coupled to a hybrid vehicle controller, wherein the motorhome controller is configured to receive operating conditions of the motorhome and transmit the operating conditions to the hybrid vehicle controller; and controlling activation of the hybrid vehicle to provide operational assistance to the motorhome.

18. The method of claim 17, wherein controlling activation of the hybrid vehicle comprises:

at least one sensor, each sensor configured for sensing at least one operating condition of the motorhome; and at least one controller configured to perform the steps of:

processing sensed data from the at least one sensor;

calculating what operational assistance is to be provided by the hybrid vehicle to the motorhome; and actuating the hybrid vehicle in response to the determination of operation assistance.

19. The hybrid dinghy pusher of claim 18, wherein the step of actuating the hybrid vehicle comprises at least one of:

actuating the electrical motor of the hybrid vehicle to selectively propel the hybrid vehicle;

actuating the electrical motor to provide selective braking to the hybrid vehicle and the motorhome; and actuating a braking system of the hybrid vehicle to provide selective braking to the hybrid vehicle and the motorhome.

20. The hybrid dinghy pusher of claim 19, wherein actuating the electrical motor of the hybrid vehicle comprises propelling the hybrid vehicle to reduce the towing load on the motorhome.

21. The hybrid dinghy pusher of claim 19, wherein actuating the electrical motor of the hybrid vehicle comprises selectively propelling the hybrid vehicle and the motorhome.

* * * * *